United States Patent
Kaushik et al.

(10) Patent No.: US 8,015,376 B2
(45) Date of Patent: Sep. 6, 2011

(54) METHODS AND SYSTEMS FOR MANAGEMENT OF COPIES OF A MAPPED STORAGE VOLUME

(75) Inventors: Shyam Kaushik, Bangalore (IN); William P. Delaney, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 693 days.

(21) Appl. No.: 12/163,079

(22) Filed: Jun. 27, 2008

(65) Prior Publication Data

US 2009/0327626 A1    Dec. 31, 2009

(51) Int. Cl.
*G06F 12/16*    (2006.01)

(52) U.S. Cl. ..................... 711/162; 707/649

(58) Field of Classification Search .................. None
See application file for complete search history.

(56) References Cited

U.S. PATENT DOCUMENTS

| | | | |
|---|---|---|---|
| 6,895,415 B1* | 5/2005 | Rezaul Islam et al. | 1/1 |
| 7,886,119 B1* | 2/2011 | Cameron et al. | 711/162 |
| 2004/0078533 A1* | 4/2004 | Lee et al. | 711/162 |
| 2004/0093474 A1 | 5/2004 | Lin et al. | |
| 2004/0158566 A1* | 8/2004 | Chong et al. | 707/100 |
| 2006/0047926 A1* | 3/2006 | Zheng | 711/162 |
| 2006/0053139 A1* | 3/2006 | Marzinski et al. | 707/101 |
| 2009/0055447 A1* | 2/2009 | Sudhakar | 707/204 |
| 2009/0307450 A1* | 12/2009 | Lee | 711/162 |

* cited by examiner

*Primary Examiner* — Kaushikkumar Patel
(74) *Attorney, Agent, or Firm* — Duft Bornsen & Fishman LLP (57) ABSTRACT

Methods and systems for rapid creation of copies of a mapped storage volume. A new copy of a mapped storage volume is created by copying the mapping table and updating meta-data associated with the new copy and any ancestral parents thereof. The physical blocks remain untouched when creating a new copy as does any meta-data associated with the physical blocks. Rather, reference meta-data associated with each physical block is updated only in response to processing of a write request to an identified block of an identified copy of the mapped storage volume. Thus copy creation is rapid as compared to prior techniques reliant on reference counters.

17 Claims, 8 Drawing Sheets

METHODS AND SYSTEMS FOR MANAGEMENT OF COPIES OF A MAPPED STORAGE VOLUME

BACKGROUND

1. Field of the Invention

The present invention relates to storage system management and more specifically relates to systems and methods for management of copies of a logically mapped storage volume.

2. Discussion of Related Art

The requirements for storage system capacity and performance continue to grow as new applications evolve utilizing mass storage systems coupled to computing networks. Some storage systems provide their full physical storage capacity as the aggregate physical capacity of a plurality of storage devices (e.g., disk drives) embodied within the storage system. Other storage systems are referred to as mapped storage systems in that the logical addresses utilized by computer systems coupled to the storage systems need not correspond to the specific physical storage locations. Rather, such a mapped storage system provides one or more mapped storage volumes where each mapped volume is defined by a mapping table that translates or maps computer system provided logical addresses into corresponding physical locations. One exemplary embodiment of such mapped storage systems is referred to as a "thin provisioned" storage system. A thin provisioned storage system is one that provides a larger logical/virtual capacity for storage volumes than may be presently physically available in the mapped volume. As computer system applications store new data, additional physical storage may be added or configured into the mapped volume so as to permit physical capacity to grow as the larger logical storage capacity is utilized.

It is generally known that some applications require creation of a "snapshot" or "point in time" copy to be generated of an existing storage volume. The snapshot or point in time copy may be used by an application program concurrently with the original storage volume from which it was copied. In one embodiment of a mapped storage system, a copy of a mapped storage volume is generated, in general, by simply creating a new copy of the mapping table structures that define the mapped storage volume. Such copies of such a mapped storage volume may be used, for example, in database applications where an update or upgrade to a database system may be tested using a temporary copy of the mapped storage volume where the database is stored. Or, for example, backup utilities may generate a snapshot copy of a storage volume for purposes of performing the desired backup while other applications continue to access the original copy of the storage volume.

Since the copies of a mapped storage volume are generally created by copying the mapping table of the original volume (or any other copy), a mechanism must be provided to coordinate write request operations so that each copy retains access to appropriate physical storage content despite ongoing write operations that may change the content of a logical storage location in another specific copy. For example, where a snapshot or point in time copy of a storage volume is created to test a database application, the database test procedures may overwrite logical blocks while the original copy remains unchanged by these test procedures for continuing operation of the production database applications.

Prior mapped storage management techniques utilize reference counters—e.g., meta-data counters associated with each physical block of the storage system indicating the present number of storage volumes that reference the corresponding physical block. Thus when a mapped storage volume is initially created the reference count of each physical block of the storage volume may be initialized to one. As a new copy is generated, the reference count of each physical block is incremented to an updated count of two. When either copy of the mapped storage volume receives a write request to modify a logical block mapped to a corresponding physical block, the reference count meta-data is inspected to determine if other copies of the mapped storage volume may require ongoing access to the physical block. If so, the mapped storage volume management structures may allocate a new physical block for the copy of the mapped storage volume desiring to modify the physical storage. The reference count for the original physical block is decremented to indicate one less copy accessing the corresponding physical block.

A problem arises in such known mapped storage management techniques in that the processing to generate a new copy of a volume may be time consuming. To create a new copy of the mapped storage volume using reference count meta-data associated with each physical block, the reference count for each block must be located and incremented to indicate creation of a new copy. In addition, such reference count meta-data indicates only the number of copies that may require access to the corresponding physical block and does not provide information regarding which of the potentially multiple copies may require such access. It is evident from the above discussion that an ongoing needed just to improve the

SUMMARY

The present invention solves the above and other problems, thereby advancing the state of the useful arts, by providing methods and systems that improve storage system performance in creating a new copy of a mapped storage volume. Features and aspects hereof also permit accurate identification of which of multiple copies of a mapped storage volume may require access to each physical storage block. Ancestral meta-data is associated with each copy of the mapped storage volume. The ancestral meta-data indicates the parental ancestral relationship among various copies of a mapped storage volume. In addition, reference meta-data is associated with each physical block of the storage system to indicate precisely which of the multiple copies of the mapped storage volume may require access to the corresponding physical block (through their respective mapping tables). In accordance with features and aspects hereof, each copy of the mapped storage volume is associated with the current value of an ordinal value associated with the mapped storage volume. The ordinal value is incremented as each new copy of the volume is created. Thus, each copy of the mapped storage volume is associated with a unique ordinal value. The unique ordinal value is also used to define a corresponding unique bit in bitmask fields. Ancestral meta-data associated with each copy of a mapped storage volume utilizes the unique bit of each copy to indicate the ancestral parental relationship of the various copies. In addition, reference meta-data associated with each physical block of the mapped storage system includes bitmask fields where the unique bit associated with each copy serves to indicate the identity of each copy that may access the corresponding physical block. Features and aspects hereof utilize the ancestral and reference meta-data to rapidly generate a new copy of a mapped storage volume without the need for updating meta-data of each physical block associated with the mapped storage system.

DETAILED DESCRIPTION OF THE DRAWINGS

Figure 1:
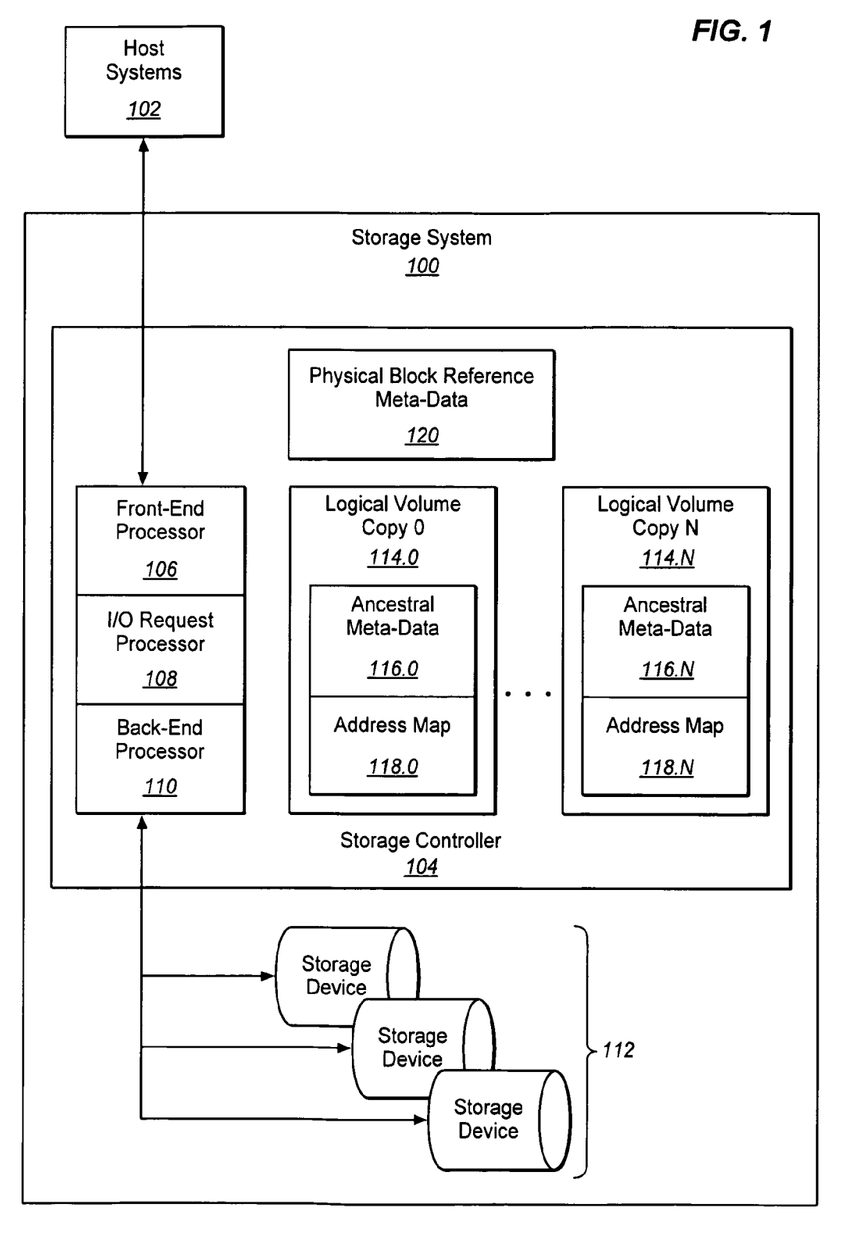
FIG. 1 is a block diagram of an exemplary mapped storage system improved in accordance with features and aspects hereof to utilize reference meta-data and ancestral meta-data to rapidly generate additional copies of a mapped storage volume.

FIG. 1 is a block diagram of a mapped storage system 100 enhanced in accordance with features and aspects hereof to provide rapid creation of a new copy of a mapped storage volume and to coordinate write access to the physical blocks within storage system 100 by such multiple copies of a mapped storage volume. System 100 includes a storage controller 104 that couples storage system 100 to host systems 102. Controller 104 may be coupled to one or more host systems 102 through a front end processor 106 adapted to the utilized any of several well-known, commercially available interface protocols and media including, for example, parallel SCSI, serialize attached SCSI (SAS), parallel advanced technology attachment (PATA), serial advanced technology attachment (SATA), Fibre Channel, etc. Storage system 100 also includes one or more storage devices 112 coupled to the storage controller 104 through back end processor 110. Coupling between back end processor 110 and storage devices 112 may also utilize any of several well-known, commercially available communication protocols and media including, SAS, parallel SCSI, PATA, SATA, Fibre Channel, etc. I/O request processor 108 within storage controller 104 represents any suitable processing means for receiving I/O requests from attached host systems 102 through front end processor 106, for processing the received I/O requests by communicating with storage devices 112 through back end processor 110. Those of ordinary skill in the art will readily recognize that front end processor 106, I/O request processor 108, and back end processor 110 may be embodied in any number of suitable general-purpose or custom processing circuits. In one exemplary embodiment, I/O request processor 108 may be a general purpose processor optionally enhanced with one or more "assist" circuits for storage management and front end processor 106 and back end processor 110 may each be special purpose processors adapted for processing one or more particular communication protocols over one or more particular communication media.

In accordance with features and aspects hereof, storage controller 104 includes suitable memory for storing physical block reference meta-data 120 and mapping information representing each of multiple copies of one or more logical volumes (114.0 through 114.N). Suitable memory for such meta-data storage may include non-volatile memories such as flash memory or volatile random access memories the contents of which may be periodically stored (backed up) on the persistent storage media of the storage devices 112. Physical block reference meta-data 120, in general, comprises meta-data associated with each physical block of storage devices 112 indicating in part precisely which of multiple copies of a mapped storage volume may access the corresponding physical block. Details of exemplary physical block reference meta-data and methods utilizing such meta-data are discussed further herein below.

Each copy 114.0 through 114.N of a mapped storage volume is represented by data structures defining the logical content of that copy of the mapped stored volume. Address maps 118.0 through 118.N each represent a mapping table associated with a corresponding copy of a mapped storage volume that associates each logical block of the logical address space of the copy with a corresponding physical block stored on storage devices 112. Each physical block then has associated meta-data in physical block reference meta-data 120.

In accordance with features and aspects hereof, each copy of a logical mapped storage volume also includes ancestral meta-data 116.0 through 116.N defining ancestral parental relationships among the various copies of a mapped storage volume. Ancestral meta-data 116.0 through 116.N generally represents information regarding parental ancestors of each copy of the mapped storage volume. Exemplary details of the structure of such ancestral meta-data and methods utilizing the meta-data are discussed further herein below.

In operation, storage system 100 generally responds to a request from a host system 102 to create a new copy of a mapped storage volume by creating a new data structure 114.0 through 114.N to represent the content of the new copy as mapping table 118 and to represent ancestral parents of the newly generated copy as ancestral meta-data 116. Generating a new copy requires only a duplication of the data structure 114.0 through 114.N of its immediate parental ancestor and updating the ancestral relationship of all preceding parental copies to indicate the new parental ancestor relationship with the new copy generated therefrom. By contrast to prior techniques, creation of a new copy is very rapid in that the meta-data associated with each physical block of the storage system need not be modified or updated for purposes of creating a new copy.

Further, in operation of storage system 100, storage controller 104 processes/executes a received write request by coordinating access to the affected physical blocks by use of the reference meta-data 120 associated with an affected physical block and with reference to the ancestral meta-data 116.0 through 116.N for the copy to which the write request is directed. Details of processing of such a write request to coordinate access to physical blocks by each of the multiple copies is discussed further herein below.

Those of ordinary skill in the art will readily recognize numerous additional and equivalent elements that may be present in a fully operational storage system 100. Such additional and equivalent elements are omitted herein merely for simplicity and brevity of this discussion.

Figure 2:
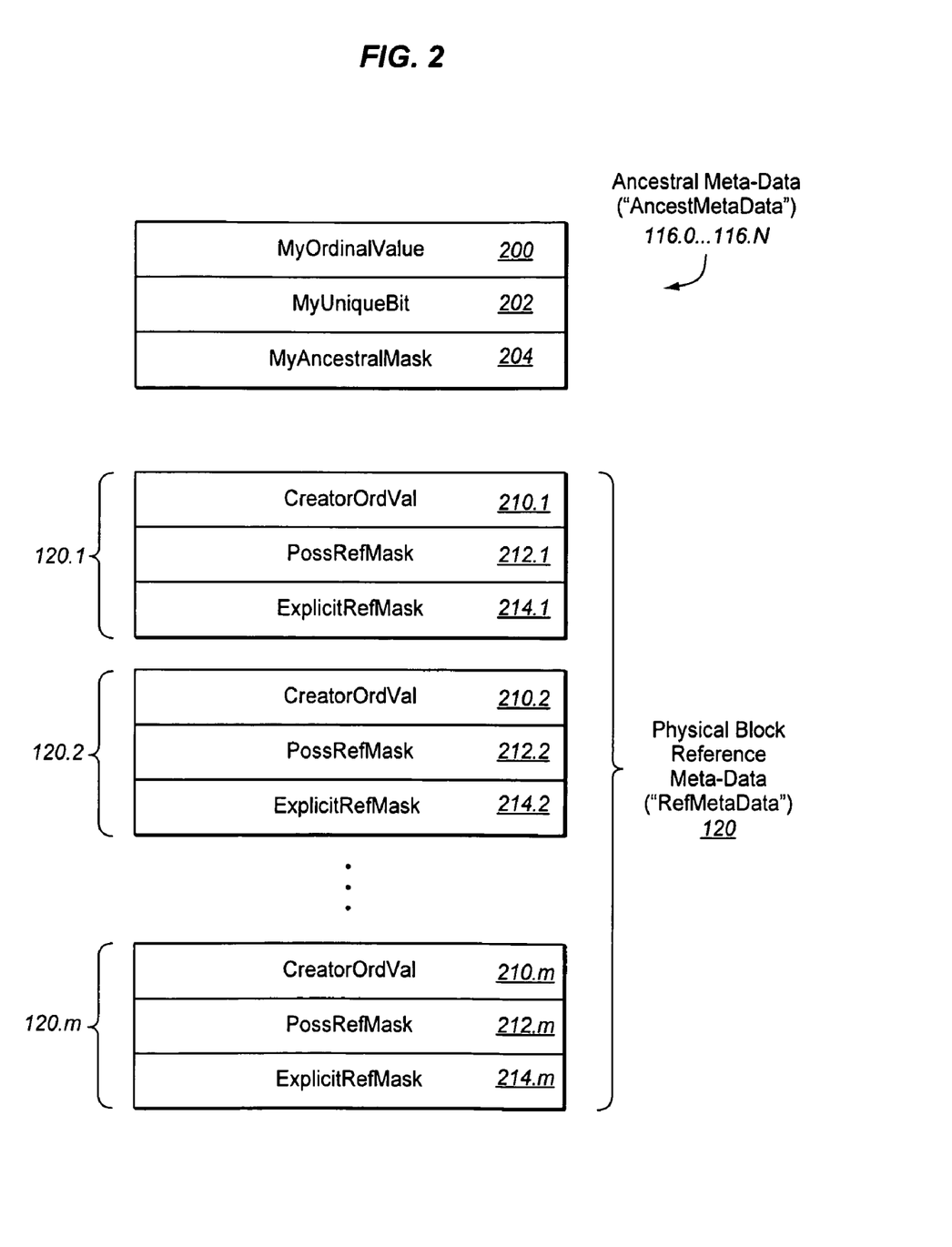
FIG. 2 is a diagram of exemplary data structures in accordance with features and aspects hereof to provide ancestral meta-data associated with each copy of the mapped storage volume and to provide reference meta-data associated with each physical block of the mapped storage system.

FIG. 2 is a diagram of exemplary data structures for storing ancestral meta-data 116.0 through 116.N (e.g., AncestMeta-Data data structures) and for storing physical block reference meta-data 120 (e.g., RefMetaData data structures) in accordance with features and aspects hereof. For each generated copy of a mapped storage volume an ancestral meta-data structure is associated with the newly created copy of the mapped storage volume. Ancestral meta-data 116.0 through 116.N each may include a copy ordinal value field 200 (MyOrdinalValue field) representing the ordinal value associated with the corresponding copy. As noted above, the ordinal value of a new copy will be incremented from the previous value such that each newly created copy is associated with a unique ordinal value. In addition, the ancestral meta-data may include a unique bit field 202 (MyUniqueBit field) representing the ordinal value 200 of a copy as a unique bit to be utilized in generating and maintaining ancestral meta-data information and physical block reference meta-data information. Further, ancestral meta-data may include an ancestral bitmask field 204 (MyAncestralMask field) in which each bit of the ancestral bitmask field 204 represents a corresponding copy of the multiple copies of a mapped storage volume. Setting a bit in the ancestral bitmask field 204 indicates that the corresponding copy is an ancestral parent of the copy corresponding to the ancestral meta-data structure. A reset bit in the ancestral bitmask field 204 indicates that the corresponding copy is not an ancestral parent of the copy corresponding to the ancestral meta-data structure. Thus, the ancestral meta-data structure 116.0 through 116.N fully defines the ancestral relationship of any parents of the corresponding copy of the mapped storage volume.

Each physical block of the mapped storage system is associated with a corresponding physical block reference meta-data structure 120.1 through 120.M (RefMetaData data structures). Each reference meta-data structure 120.1 through 120.M may include an a creator ordinal value field 210.1 through 210.M (CreatorOrdVal field) indicating the ordinal value associated with the copy of the mapped storage volume that first created the physical block corresponding to the reference meta-data structure. Each reference meta-data structure 120.1 through 120.M may also include a reference bitmask 212.1 through 212.M (PossRefMask field) indicating which copies of the mapped storage volume may possibly reference the corresponding physical block. In one exemplary embodiment, each bit in the possible reference bitmask field 212.1 through 212.M indicates whether the copy whose unique bit corresponds to that bit position may possibly reference the corresponding physical block. For example, all bits in the possible reference bitmask field 212.1 through 212.M may be initialized to a logical one value indicating that all possible copies may reference the corresponding physical block. As a physical block is modified by a write request directed to a particular copy of the mapped storage volume, the bit for the affected block physical block to be overwritten may be reset to logical zero indicating that the particular copy no longer accesses the corresponding affected physical block but rather is re-mapped to a new physical block for purposes of overwriting the original information in the identified physical block. Lastly, each reference meta-data structure 120.1 through 120.M may include an explicit reference bitmask field 214.1 through 214.M (ExplicitRefMask field). As above, each bit in the explicit reference bitmask field 214.1 through 214.M corresponds to the unique bit of a copy of the mapped storage volume. Also as above, when an identified physical block is to be overwritten in an identified copy of the mapped storage volume, child copies for which the identified copy is a parental ancestor will continue to reference the original content of the identified physical block. The explicit reference bitmask field 214.1 through 214.M indicates such a condition by setting the unique bit for each child copy that may continue referencing the original content of identified block that was to be overwritten in an identified copy responsive to processing the write request.

Appropriate Boolean logic using the various bitmask fields in the ancestral meta-data 116 associated with each copy of the mapped storage volume and using the physical block reference meta-data 120 associated with each physical block may determine exactly which of the multiple copies of the mapped storage volume may access each physical block of the storage system. Details of such Boolean logic are discussed further herein below. However, in general, the physical block reference meta-data structures 120.1 through 120.M need not be accessed when creating a new copy of the mapped storage volume from a previous ancestral parent copy. Thus the processing to create a new copy is dramatically faster as compared to prior techniques that required updating reference counters in meta-data associated with each physical block upon creation of a new copy.

Figure 3:
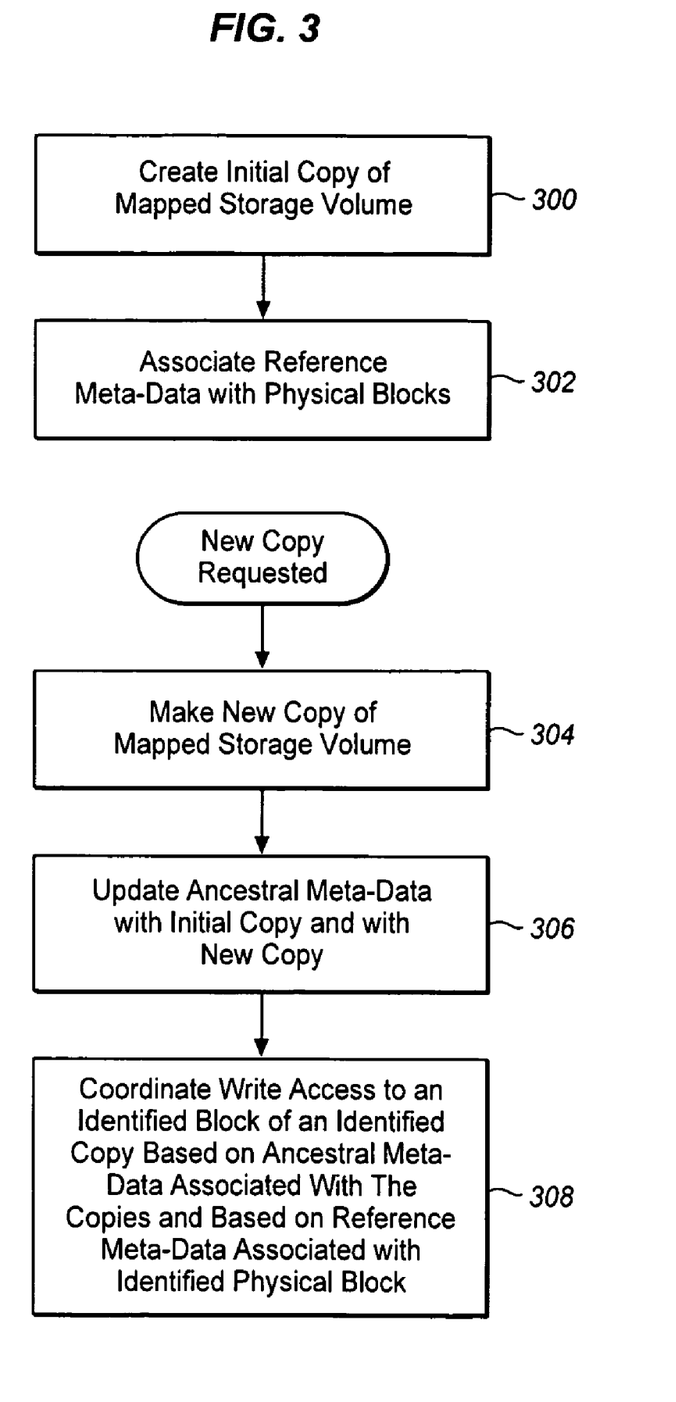
FIG. 3 is a flowchart describing an exemplary method in accordance with features and aspect hereof to permit rapid creation of a copy of the mapped storage volume and to coordinate write access among multiple copies utilizing reference meta-data associated with an identified physical block and ancestral meta-data associated with a volume.

Those of ordinary skill in the art will readily recognize numerous equivalent data structures and designs to implement the meta-data fields of FIG. 2. In general, features and aspects hereof provide such meta-data without the need for counters associated with each physical block that require an update upon creation of a new copy of a mapped storage volume. Such additional and equivalent designs will be readily apparent to those of ordinary skill in the art FIG. 3 is a flowchart describing an exemplary method for creating and managing multiple copies of a mapped storage volume in accordance with features and aspects hereof. The method of FIG. 3 may be performed by suitable processors of a storage controller in a storage system such as the storage system shown in FIG. 1 and discussed above. Step 300 first creates an initial copy of a mapped storage volume. As noted above, an initialized mapped storage volume may include a mapping table for translating or mapping logical block addresses into corresponding physical block addresses/locations in the storage system. In addition, the newly created volume may include ancestral meta-data appropriately initialized with a starting ordinal value and a corresponding unique bit assignment for use in bitmask fields of various meta-data structures. Further, the ancestral meta-data bitmask field representing ancestral relationships will be initialized for the newly created copy by setting the unique bit for this initial copy indicating it is the parent of any later copies. Step 302 further initializes the newly created volume by associating reference meta-data with each of the physical blocks of the storage volume. The reference meta-data for each physical block is initialized with a possible reference bitmask indicating that this initial copy and all future copies may access the physical block. An explicit reference bitmask in each blocks meta-data is initialized to zero indicating that no current child requires continuing access to the block (since initially no child copy exists).

With the initial volume copy created, the storage system may process read and write requests normally since the only existing copy of the mapped storage volume is the initial copy.

Step 304 represents subsequent processing responsive to a request to create a new copy of the mapped storage volume from an identified, previously created copy of the volume. A "current" copy may be maintained in the storage controller such that a request to create a copy may default to creating a new copy from whatever is the newest, most recently created copy. In general, the request to create a new copy will be generated from an attached host system and will identify precisely which previous copy of the mapped storage volume should be used to create the new copy. As noted above database management applications may be the find it useful to create a copy of a mapped storage volume containing a database application to allow testing of upgrades or modifications to the database application. Or, as also noted above, a backup application program may request creation of a copy of a mapped storage volume for purposes of performing a backup as the original storage volume continues to receive I/O requests.

Step 304 creates a new copy by simply duplicating any required mapping table from the identified or current copy. In addition, step 304 duplicates the ancestral meta-data associated with the identified or current copy to use as the initial ancestral meta-data associated with the new copy. In step 306, the ordinal value associated with the newly created copy is incremented and an appropriate corresponding unique bit position is defined for the newly created copy. The ancestral bitmask associated with all preceding parents of the newly created copy will then be updated by step 306 to indicate the parental ancestral relationship to the newly created copy. Additional exemplary details of the processing of steps 300 through 306 are discussed further herein below with reference to FIGS. 4 and 5.

Step 308 then represents ongoing processing to coordinate execution of write requests directed to an identified physical block of an identified copy of the mapped storage volume based on the ancestral meta-data associated with each copy and based on the reference meta-data associated with the identified physical lock. Exemplary additional details of processing of FIG. 308 to coordinate write operations directed to the various copies is discussed further herein below with regard to FIG. 6.

Figure 4:
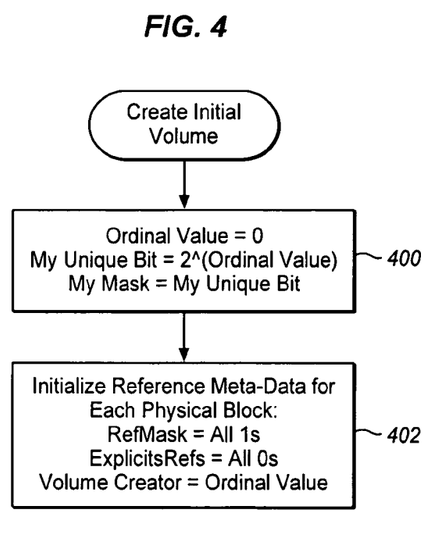
FIGS. 4 and 5 are flowcharts providing exemplary additional details of processing steps of the method of FIG. 3 in accordance with features and aspects hereof.

FIG. 4 is a flowchart representing exemplary processing to create an initial copy of a mapped storage volume in accordance with features and aspects hereof. Step 400 initializes the ordinal value for the mapped volume to zero and sets the unique bit for this initially created volume to a unique bit corresponding to the ordinal value. For example, the unique bit for this initial copy of the mapped storage volume may be determined as $2^{(Initial\ Ordinal\ Value)} = 2^0 = 1$. Lastly, step 400 sets the ancestral bitmask corresponding to the newly created initial copy of the mapped storage volume to indicate that this copy is the parent of all subsequent copies that may be created. Step 402 then represents processing to initialize the reference meta-data for each physical block of the storage volume. The possible reference bitmask in the reference meta-data for each physical block is initialized to all ones indicating that this initial copy of the mapped storage volume and any subsequent child copies from this initial parent copy may possibly access this physical block. The explicit reference bitmask in the reference meta-data for each physical block is initialized to all zeros indicating that no current child requires ongoing access to the corresponding physical block (since initially no child copies of this parent have been created). Lastly, step 402 sets a volume creator ordinal value field in the meta-data for each physical block of the storage system to indicate that the current initial copy of the mapped storage volume is the creator of each of the physical blocks.

Figure 5:
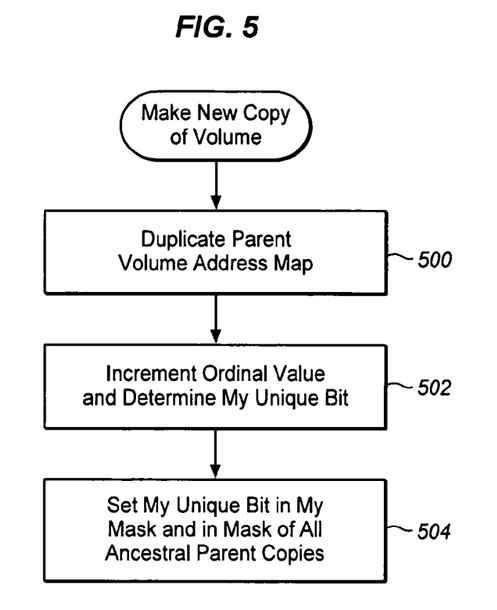

FIG. 5 is a flowchart representing exemplary processing in accordance with features and aspects hereof to create a new copy of the mapped storage volume from an identified parent copy (e.g., from the initial copy created as described in FIG. 4 or from an earlier created parental copy generated by a previous invocation of the method of this FIG. 5). Step 500 duplicates the address map of the identified parent copy to create an independent logical to physical address map table for the newly created copy. Step 502 then increments the ordinal value from its most recent value and stores the updated ordinal value in the ancestral meta-data for the newly created copy. In addition, the incremented ordinal value is used to determine the unique bit associated with this newly created copy. The unique bit for this copy may be determined as above as $2^{(Updated\ Ordinal\ Value)}$. The unique bit so determined is stored in the ancestral meta-data associated with the new copy of the mapped storage volume. Lastly, step 504 sets the unique bit associated with the newly created copy in the ancestral bitmask field of the meta-data of the newly created copy and in the ancestral bitmask field of all ancestral parent copies of the newly created copy.

Figure 6:
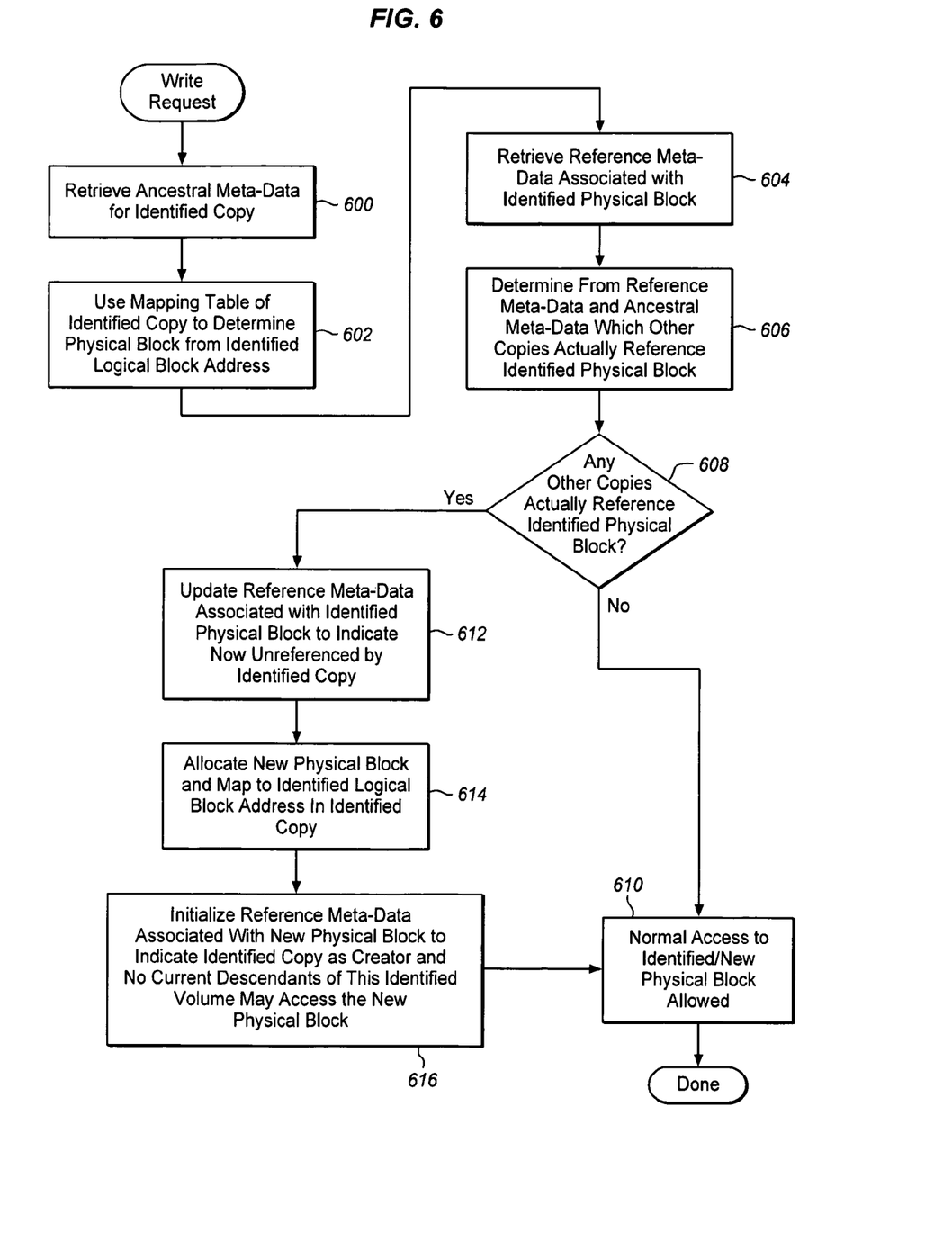
FIG. 6 is a flowchart describing another exemplary method in accordance with features and aspects hereof for coordinating write access to an identified physical block by an identified copy of multiple copies of a mapped storage volume in accordance with features and aspects hereof.

FIG. 6 is a flowchart describing processing of a write request in accordance with features and aspects hereof to coordinate execution of write requests directed to any previously created copies of the mapped storage volume. Responsive to receipt of a write request directed to a particular identified copy of the mapped storage volume and a particular identified logical block to be written, step 600 first retrieves the ancestral meta-data associated with the identified copy of the mapped storage volume to which the write request is directed. Step 602 next utilizes the address mapping table of the identified copy of the mapped storage volume to determine a corresponding identified physical block from the address of the identified logical block. Step 604 then retrieves the reference meta-data associated with the identified physical block. Step 606 then determines, from the reference meta-data retrieved for the identified physical block and from the ancestral meta-data associated with the identified copy, which other copies (if any) actually reference the identified physical block. Simple Boolean logic operations based on the ancestral meta-data (i.e., AncestMetaData data structures 116 of FIGS. 1 and 2) of the identified copy ("i") copy and the reference meta-data (i.e., RefMetaData data structures 120 of FIGS. 1 and 2) associated with the identified physical block ("b") may determine precisely which copies actually reference the identified physical block.

PossibleReferences=RefMetaData[b].PossRefMask & AncestMetaData[CreatorOrdVal[i]].MyAncestalMask
ActualReferences=PossibleReferences & ~RefMetaData [b].ExplicitRefMask Having so determined which (if any) copies of the mapped storage volume actually reference the identified physical block step 608 next determines whether any such other copies actually require use of the identified physical block. If no other copies are determined by step 608 to actually require access to the identified physical block, processing continues at step 610 to perform normal access writes operations on the identified physical block by overwriting the contents of the identified physical block with the new data supplied in the write request. If step 608 determines that some other copy or copies may require access to the identified physical block, processing continues at step 612 to update the reference meta-data associated with the identified physical block to indicate that the identified copy will no longer require access to the identified physical block. Rather, the data to be written into the identified physical block will be written into a new physical block thus leaving the identified physical block available for access by other copies of the mapped storage volume that were determined to require access thereto. Step 614 therefore allocates a new physical block for use by the identified copy of the mapped storage volume and adjusts the mapping tables associated with the identified copy so that the identified logical block address in the identified copy now points to the newly allocated physical block. Step 616 then initializes the possible reference bitmask in the reference meta-data associated with the newly allocated physical block to indicate that the identified copy of the mapped storage volume is the creator of the copy and further to indicate that no current descendants of the identified copy may access the newly allocated physical block. In other words, any child copies (copies created from the identified copy as a parent in the ancestral relationship) will continue to access the initially identified physical block while the currently identified copy will access a different, newly allocated physical block at the same logical block address. Processing continues at step 610 to permit normal access to the newly allocate allocated physical block by writing the data supplied in the write request into the newly allocated block.

The exemplary methods of FIGS. 3 through 6 may include additional or equivalent processing steps as a matter of design choice in a fully functional implementation. Further, the particular data structures manipulated by the methods above may be implemented in a number of equivalent manners. It will be noted that the exemplary data structures and methods presented above provide a benefit as compared to prior techniques that rely upon reference counters in association with each physical block. Specifically, as noted above, creating a new copy of the mapped storage volume requires only access to the ancestral meta-data structures associated with each copy and does not require access to the reference meta-data structures associated with each physical block in the storage system. Thus creation of a new copy is performed substantially faster than prior techniques. Further, the methods above utilize the ancestral meta-data of the various copies and the reference meta-data of an identified physical block to coordinate write access to the identified block where multiple copies may require access to the unmodified data in the identified physical block.

Figure 7:
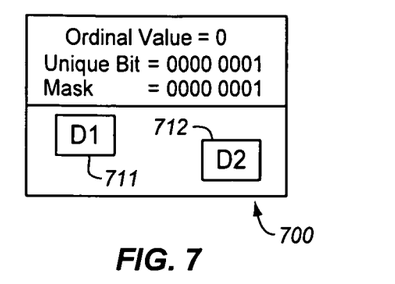
FIGS. 7 through 14 are block diagrams representing exemplary operations to create a new copy of a mapped storage volume and to coordinate write operations among the various copies in accordance with features and aspects hereof.

Features and aspects hereof may also be understood by way of exemplary operations as depicted in FIGS. 7 through 14. Each figure (7 through 14) shows one or more copies (700 through 704) of a mapped storage volume. Each of the depicted copies reference the same two logical blocks for purposes of this discussion. Meta-data in each copy includes a mapping table to translate the logical block addresses of each of these two logical blocks (and any other logical blocks) into corresponding physical block addresses. FIG. 7 shows a representation of an initially created copy 700 of a mapped storage volume with two logical blocks 711 and 712. Logical block 711 is mapped to physical block "D1" and logical block 712 is mapped to physical block "D2". This initial copy 700 has an ordinal value of zero in its ancestral meta-data (the initial value of the ordinal value) and a corresponding unique bit of "0000 0001" assigned to it. The ancestral bitmask in the ancestral meta-data for this initial copy is initialized to "0000 0001" to indicate that this is the initial copy (i.e., the parent of all presently existing copies).

In creation of this initial copy of the mapped storage volume, the reference meta-data for all physical blocks of the mapped storage volume (including blocks D1 and D2) is initialized. The reference meta-data associated with these two exemplary physical blocks may be represented as follows:

| Physical Block ID | Creator Copy Ordinal ID | Possible Reference Bitmask | Explicit Reference Bitmask | Possibly Referenced By | Actually Referenced By |
|---|---|---|---|---|---|
| D1 | 0 | 1111 1111 | 0000 0000 | 0000 0011 | 0000 0011 |
| D2 | 0 | 1111 1111 | 0000 0000 | 0000 0011 | 0000 0011 |

The ordinal value (ID) of the creating copy of both physical blocks is "0"—the ordinal value of the initial copy of the mapped storage volume. The possible reference bitmask field of the meta-data for both physical blocks is "1111 1111" indicating that all possible present and future copies of the mapped storage volume may access the corresponding physical block. The explicit reference bitmask field of the meta-data for each physical block is initialized to "0000 0000" indicating that no children of this parent explicitly reference this physical block—since no children copies are yet created and since no subsequent copy has yet un-referenced any physical blocks.

Those of ordinary skill in the art will readily recognize that the number of bits in the various bitmask fields may be selected as a matter of design choice based on the maximum number of copies to be permitted of a mapped storage volume. As shown herein, an exemplary embodiment permits up to eight copies (including the initial copy) to be created from a mapped storage volume.

Figure 8:
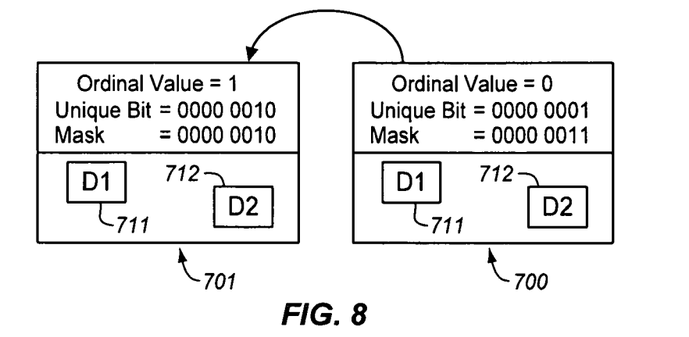

FIG. 8 shows a change to the storage system responsive to a request from an attached host system to generate a new copy of the initial copy of the mapped storage volume. New copy 701 is initialized by duplicating the mapping tables and ancestral meta-data of initial copy 700—its parental ancestor. The ordinal value in the meta-data of the newly created copy is incremented to a value of one and the unique bit associated with newly created copy 701 is determined as "0000 0010" ($2^1$) according to the incremented ordinal value. The ancestral bitmask of newly created volume copy 701 is initialized with the unique bit of this newly created copy as "0000 0010". The initial copy 700 is updated such that its ancestral bitmask also has the unique bit of the newly created copy 701 set in its ancestral bitmask a field of its meta-data (i.e., it is updated to "0000 0011" to indicate that it is the parent copy of both copies 700 and 701 (with ordinal values of 0 and 1, respectively). Since the newly created copy imposed no change in the reference meta-data associated with physical blocks D1 and D2, the reference meta-data is therefore unchanged and hence the new copy 701 is created rapidly as compared to prior techniques.

Figure 9:
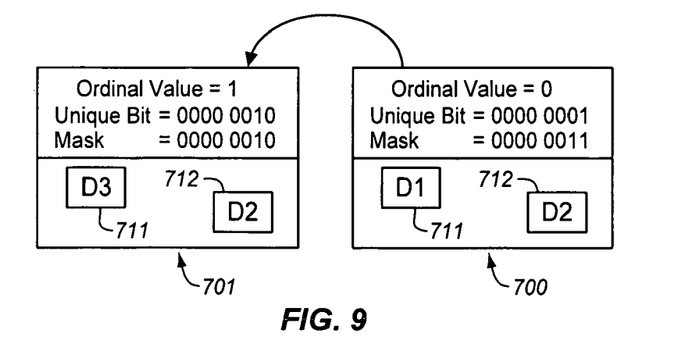

In FIG. 9 an attached host system has requested a write operation to the logical block 711 that corresponded previously to physical block D1. The write request has requested that the physical block be overwritten to contain altered data. As discussed above with reference to the exemplary methods, write request processing of the storage system will determine that another copy (i.e., initial copy 700) may still require access to the original contents of physical block D1. This may be determined as discussed above by a bitwise logical ANDing of the physical block's possible reference bitmask and the ancestor bitmask of the copy that created the physical block. Here that Boolean logic would be: ("1111 1111" AND "0000 0011")="0000 0011". In other words, both copies 700 and 701 may still access the physical block D1 and hence the write request to identified logical block 711 (mapped to identified physical block D1) by identified copy 701 must take care to leave the original physical block D1 unchanged. Thus, a new physical block "D3" will be allocated to contain the write request and reference meta-data associated with blocks physical blocks D1 and D3 will reflect the change in state. In particular, the possible reference bitmask in the meta-data of physical block D1 will be altered to remove the unique bit associated with copy 701—the identified copy associated with the write request. The reference meta-data associated with these exemplary physical blocks may be represented as follows:

| Physical Block ID | Creator Copy Ordinal ID | Possible Reference Bitmask | Explicit Reference Bitmask | Possibly Referenced By | Actually Referenced By |
| --- | --- | --- | --- | --- | --- |
| D1 | 0 | 1111 1101 | 0000 0000 | 0000 0101 | 0000 0001 |
| D2 | 0 | 1111 1111 | 0000 0000 | 0000 0111 | 0000 0111 |
| D3 | 1 | 1111 1111 | 0000 0000 | 0000 0110 | 0000 0110 |

Figure 10:
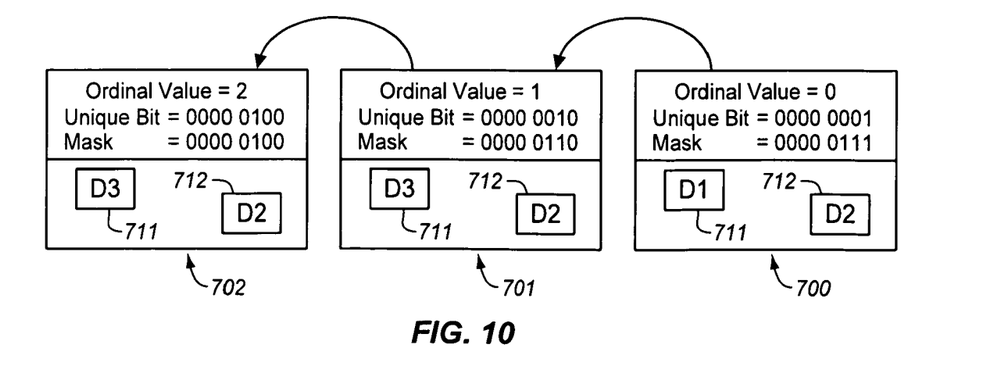

FIG. 10 shows another change to the status in that another copy has been requested by a host system requesting a new copy be created from the identified copy 701 (e.g., from the most recently generated copy). Thus the system copies the mapping tables and ancestral meta-data of copy 701 to create new copy 702. As can be seen in FIG. 10 copy 702 initially references the same changed physical block D3. The ancestral meta-data of new copy 702 is updated with a new ordinal value (incremented to 2), a corresponding unique bit ("0000 0100") and a corresponding ancestral bitmask ("0000 0100"). The ancestral bitmasks of parental ancestor copies 701 and 700 are each updated to include the unique bit of the newly created copy 702 because they are each in the chain of parental ancestors. The reference meta-data of the physical blocks (D1, D2, and D3) is unchanged by creation of this new copy and thus the new copy is created rapidly as compared to prior techniques.

Figure 11:
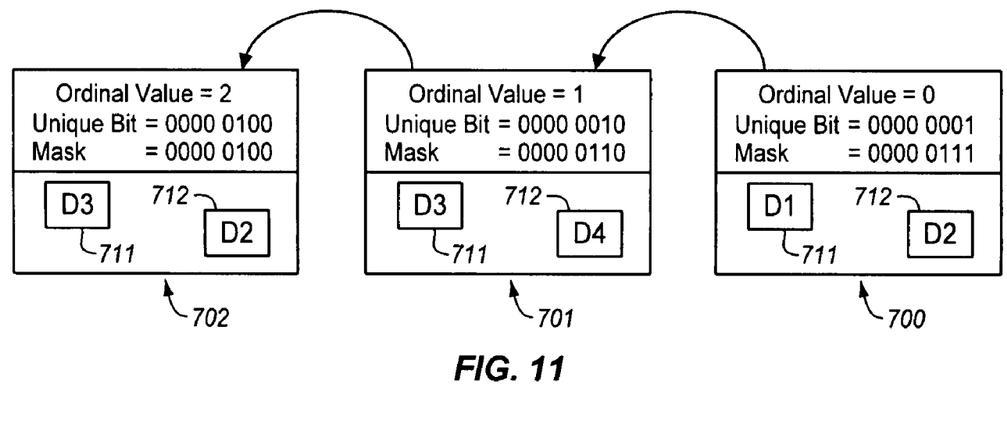

FIG. 11 shows a next exemplary change wherein a write request has requested a change in the data in identified logical block 712 of identified copy 701. First the system uses the mapping table of copy 701 (as shown in FIG. 10) to determine the corresponding identified physical block D2 to be altered by the write request. Next the system determines what (if any) other copies may possibly reference the identified physical block D2. The Boolean logic as above is applied with reference to physical block D2 ("1111 1111" AND "0000 0111")= "0000 0111". In other words, all three copies 700, 701, and 702 may still access the physical block D2 and hence the write request to identified logical block 712 (mapped to identified physical block D2) by identified copy 701 must take care to leave the original physical block D2 unchanged. Thus, a new physical block "D4" will be allocated to contain the write request and reference meta-data associated with blocks physical blocks D1 through D4 will reflect the change in state. In particular, the possible reference bitmask in the meta-data of physical block D2 will be altered to remove the unique bit associated with copy 701—the identified copy associated with the write request. However, in this case, since the ancestral meta-data associated with copy 701 indicates that it has child descendants (i.e., copy 702) the unique bit for each of those child copies of copy 701 will be set in the explicit reference bitmask field of the meta-data associated with physical block D2. The possible reference bitmask field in the meta-data associated with the new physical block D4 will have the unique bits for each of the children of copy 701 reset to indicate that they cannot reference the new physical block. The reference meta-data associated with these exemplary physical blocks may be represented as follows:

| Physical Block ID | Creator Copy Ordinal ID | Possible Reference Bitmask | Explicit Reference Bitmask | Possibly Referenced By | Actually Referenced By |
| --- | --- | --- | --- | --- | --- |
| D1 | 0 | 1111 1101 | 0000 0000 | 0000 0101 | 0000 0001 |
| D2 | 0 | 1111 1101 | 0000 0100 | 0000 0101 | 0000 0101 |
| D3 | 1 | 1111 1111 | 0000 0000 | 0000 0110 | 0000 0110 |
| D4 | 1 | 1111 1011 | 0000 0000 | 0000 0010 | 0000 0010 |

Figure 12:
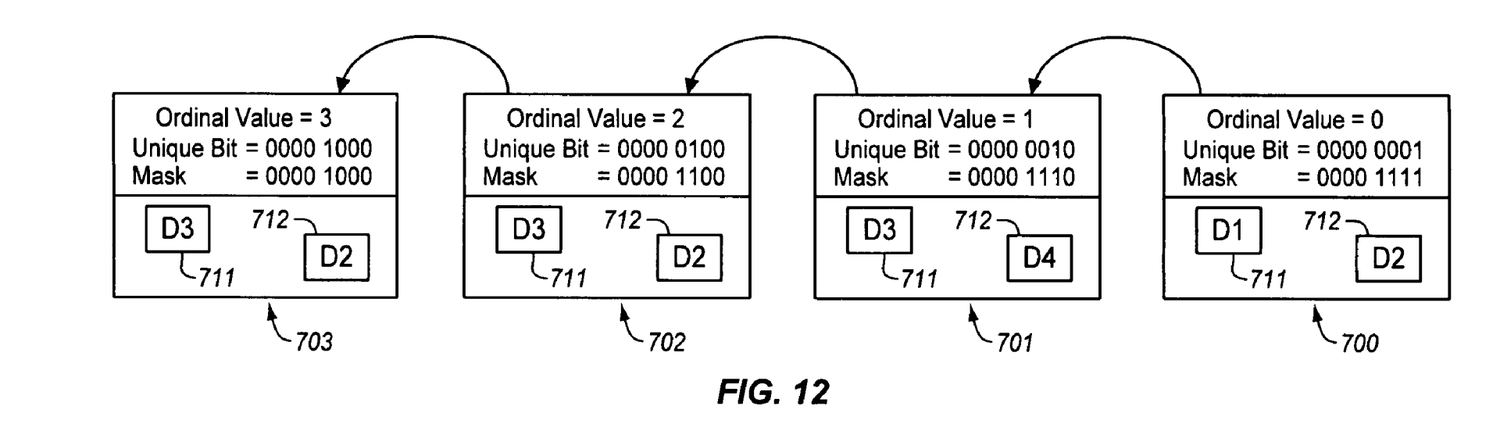
Figure 13:
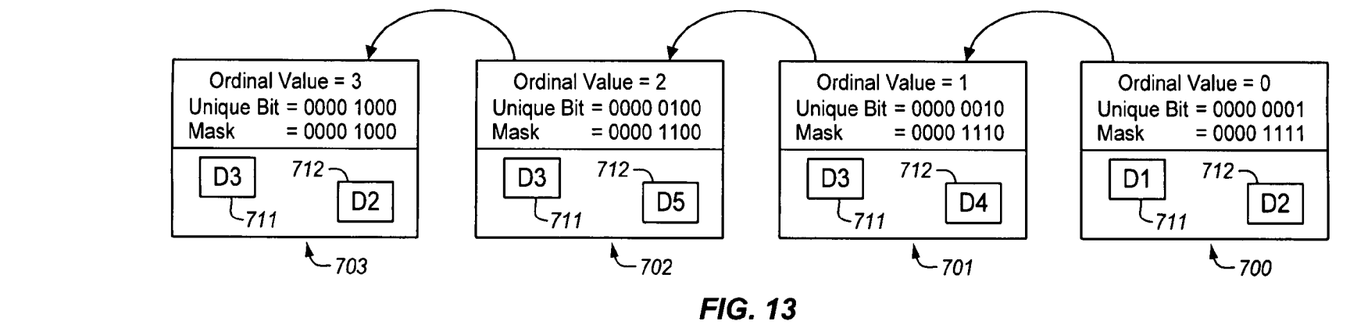

FIGS. 12 and 13 depict yet another example of creation of a new copy (703) from an earlier parent copy (702) by copying the mapping table and ancestral meta-data of the parent copy 702 to create the new copy 703. Ancestral meta-data of all ancestors (700 through 703) is updated as discussed above. FIG. 13 shows the effect of a write request directed to identified block 712 of identified copy 702. Logical block 712 was previously mapped to physical block D2 as shown in FIG. 12 but a new physical block D5 is allocated and mapped to logical block 712 in copy 702 (leaving copies 700 and 703 still accessing the original content of physical block D2). In updating the reference meta-data for physical block D2, the Boolean logic will account for the explicit reference bit set in the explicit reference meta-data for block D2 as above. Noting that yet another child has been created with similar ancestral parents, the explicit reference bitmask for physical block D2 is updated to indicate the new child copy (703) that still retains explicit access to the original content of physical block D2. The reference meta-data associated with these exemplary physical blocks may be represented as follows:

| Physical Block ID | Creator Copy Ordinal ID | Possible Reference Bitmask | Explicit Reference Bitmask | Possibly Referenced By | Actually Referenced By |
| --- | --- | --- | --- | --- | --- |
| D1 | 0 | 1111 1101 | 0000 0000 | 0000 1101 | 0000 0001 |
| D2 | 0 | 1111 1001 | 0000 1000 | 0000 1001 | 0000 1001 |
| D3 | 1 | 1111 1111 | 0000 0000 | 0000 1110 | 0000 1110 |
| D4 | 1 | 1111 1011 | 0000 0000 | 0000 1010 | 0000 0010 |
| D5 | 2 | 1111 0111 | 0000 0000 | 0000 0100 | 0000 0100 |

Figure 14:
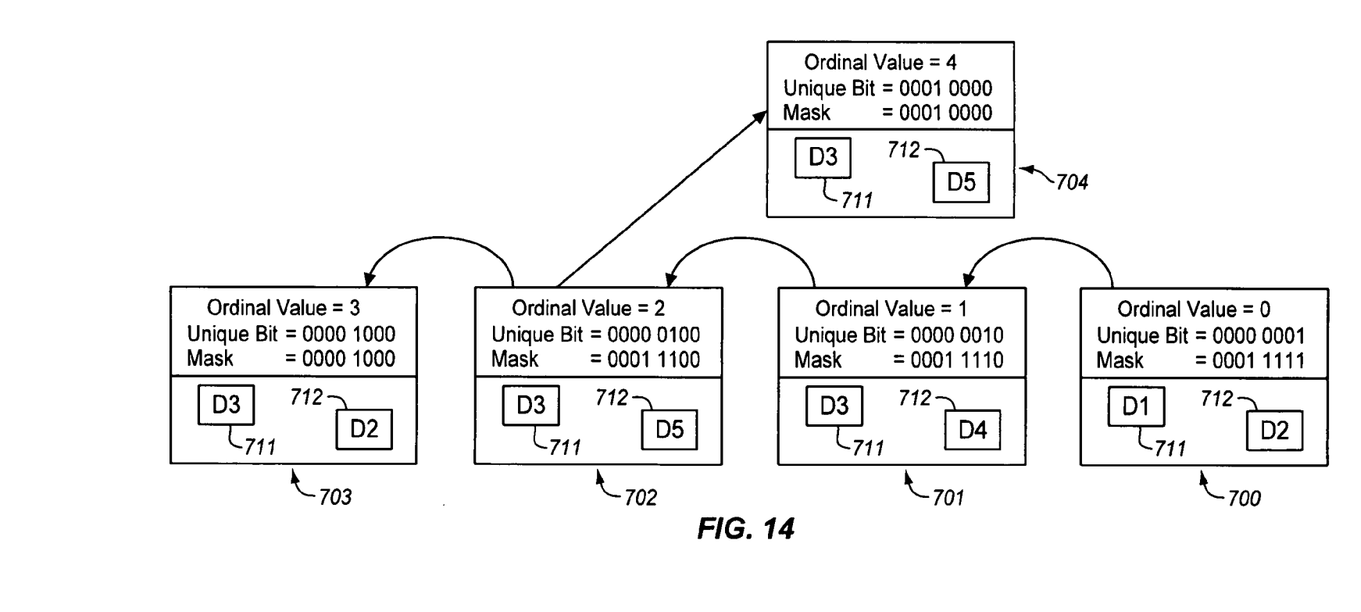

Lastly, FIG. 14 shows another exemplary operation responsive to a request to create a new copy but based on a prior identified copy rather than the most recently created copy of the mapped storage volume. In particular, a request has been received to create a new copy 704 (with ordinal value 4 and corresponding unique bit "0001 0000") based on copy earlier copy 702 rather the most recent copy 703. Thus the ancestral bitmasks of copies 704, 702, 701, and 700 are updated to reflect the ancestral relationships. However, copy 703 is not in the ancestral parent chain for this new copy 704 and thus the ancestral bitmask for copy 703 does not include the unique bit for new copy 704. The reference meta-data associated with these exemplary physical blocks may be represented as follows:

| Physical Block ID | Creator Copy Ordinal ID | Possible Reference Bitmask | Explicit Reference Bitmask | Possibly Referenced By | Actually Referenced By |
| --- | --- | --- | --- | --- | --- |
| D1 | 0 | 1111 1101 | 0000 0000 | 0001 1101 | 0000 0001 |
| D2 | 0 | 1111 1001 | 0000 1000 | 0001 1001 | 0000 1001 |
| D3 | 1 | 1111 1111 | 0000 0000 | 0001 1110 | 0001 1110 |
| D4 | 1 | 1111 1011 | 0000 0000 | 0001 1010 | 0000 0010 |
| D5 | 2 | 1111 0111 | 0000 0000 | 0001 0100 | 0001 0100 |

Numerous other examples of operations to coordinate execution of write requests to identified blocks of identified copies will be readily apparent to those of ordinary skill in the art. Further numerous additional examples of operation to create new copies or to remove previously created copies will be readily apparent to those of ordinary skill in the art. Thus the above exemplary operations and their respective effects on the ancestral and reference meta-data are intended merely as exemplary to aid the reader's understanding of the methods and structures of features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for managing copies of a mapped storage volume in a storage system having a plurality of physical blocks with each physical block having a corresponding physical block address, the method comprising:
    generating a first copy of the mapped storage volume comprising a plurality of logical blocks each mapped to a corresponding physical block;
    copying the first copy to generate a second copy of the mapped storage volume;
    associating ancestral meta-data with the first copy and with the second copy to identify an ancestral relationship between the first copy and the second copy;
    associating reference meta-data with each physical block, wherein the reference meta-data indicates which copies of the mapped storage volume may access the corresponding physical block, wherein the reference meta-data comprising a possible reference bitmask and an explicit reference bitmask; and
    executing a write request that modifies content of an identified logical block of an identified copy of the mapped storage volume, wherein the identified logical block is associated with a corresponding identified physical block, wherein the execution is based on a function of the ancestral meta-data associated with the identified copy and the reference meta-data associated with the corresponding identified physical block, and wherein the execution assures other copies of the mapped storage volume retain access to original content of the corresponding identified physical block as it exists prior to the execution of the write request.

2. The method of claim 1 wherein the step of associating ancestral meta-data further comprises:
    associating a first ordinal value with the first copy wherein the first ordinal value corresponds to a first bit position in an ancestral bitmask in the ancestral meta-data associated with the first copy;
    associating a second ordinal value with the second copy wherein the second ordinal value corresponds to a second bit position in an ancestral bitmask in the ancestral meta-data associated with the second copy;
    setting, responsive to generating the first copy, the first bit position of the ancestral bitmask in the ancestral meta-data associated with the first copy; and
    setting, responsive to generating the second copy, the second bit position of the ancestral bitmask in the ancestral meta-data associated with the second copy and the second bit position of the ancestral bitmask in the ancestral meta-data associated with the first copy.

3. The method of claim 2 wherein the step of associating reference meta-data further comprises:
    associating the possible reference bitmask with the corresponding physical block wherein the first bit position of the possible reference bitmask indicates whether the first copy may access the corresponding physical block and wherein the second bit position of the possible reference bitmask indicates whether the second copy may reference the corresponding physical block.

4. The method of claim 3 wherein the step of executing further comprises:
    resetting a bit position corresponding to the identified copy in the possible reference bitmask in the reference meta-data associated with the corresponding identified physical block;
    writing data of the write request into a new physical block;
    mapping the identified logical block in the identified copy to the new physical block;
    setting the bit position corresponding to the identified copy in the possible reference bitmask in the reference meta-data associated with the new physical block; and
    setting the bit positions corresponding to any copies of the mapped storage volume created after the creation of the identified copy in the possible reference bitmask in the meta-data associated with the new physical block.

5. The method of claim 1 wherein the step of executing further comprises:
    determining the corresponding identified physical block corresponding to the identified logical block in the identified copy;
    determining from the reference meta-data associated with the corresponding identified physical block and from the ancestral meta-data associated with the identified copy whether any other copies that have an ancestral relationship with the identified copy may access the corresponding identified physical block;
    responsive to a determination that no such other copies may access the corresponding identified physical block, performing the step of:
    writing data supplied in the write request into the corresponding identified physical block; and
    responsive to a determination that another copy of the mapped storage volume may access the corresponding identified physical block, performing the additional steps of:
    writing data supplied in the write request to a new physical block in the storage devices;
    updating reference meta-data associated with the new physical block to indicate that the identified copy may access the new physical block; and
    updating reference meta-data associated with the corresponding identified physical block to indicate that the identified copy can no longer access the corresponding identified physical block.

6. The method of claim 5 wherein the step of determining whether any other copies may access the corresponding identified physical block further comprises:
    determining, from the reference meta-data of the corresponding identified physical block, a creator copy of the mapped storage volume that created the corresponding identified physical block; and
    determining, from the ancestral meta-data of the creator copy and from the reference meta-data of the corresponding identified physical block, which other copies of the mapped storage volume may access the corresponding identified physical block.

7. The method of claim 1 wherein the step of executing further comprises:
determining the corresponding identified physical block corresponding to the identified logical block in the identified copy;
determining from the possible reference bitmask and the explicit reference bitmask associated with the corresponding identified physical block whether any other copies that have an ancestral relationship with the identified copy may access the corresponding identified physical block;
responsive to a determination that no other copy may access the corresponding identified physical block, performing the step of:
writing data supplied in the write request into the corresponding identified physical block; and
responsive to a determination that another copy may access the corresponding identified physical block, performing the additional steps of:
writing data supplied in the write request to a new physical block in the storage devices;
updating a bit in the possible reference bitmask associated with the new physical block to indicate that the identified copy may access the new physical block;
updating a bit in the explicit reference bitmask associated with the new physical block to indicate that no other current copies of the mapped storage volume may access the new physical block;
updating the possible reference bitmask associated with the corresponding identified physical block to indicate that the identified copy can no longer access the corresponding identified physical block; and
updating the explicit reference bitmask associated with the corresponding identified physical block to indicate that all children copies of which the identified copy is an ancestral parent may access the corresponding identified physical block.

8. A storage system comprising:
a plurality of physical storage devices comprising a plurality of physical blocks; and
a storage controller coupled to the plurality of physical storage devices and configured to define one or more copies of a mapped storage volume, each copy of the mapped storage volume comprising a plurality of logical blocks, each logical block mapped to a corresponding physical block of the plurality of physical blocks, the storage controller further comprising:
ancestral meta-data associated with said each copy of the mapped storage volume and indicating ancestral relationships between said each copy of the mapped storage volume and other copies of the mapped storage volume; and
reference meta-data associated with each physical block and defining which of the one or more copies of the mapped storage volume may reference an associated physical block, wherein the reference meta-data further comprises a possible reference bitmask field and an explicit reference bitmask field,
wherein the storage controller is configured to update the ancestral meta-data of each copy having an ancestral relationship with a new copy when the new copy of the mapped storage volume is created, and
wherein the storage controller is configured to process a received write request affecting an identified physical block of an identified copy based on the ancestral meta-data of the one or more copies of the mapped storage volume and based on the reference meta-data associated with the identified physical block.

9. The storage system of claim 8 wherein the storage controller is further configured to update the reference meta-data associated with the identified physical block that is to be overwritten by the storage controller in processing the write request to the identified copy to indicate which of the plurality of copies may continue to access an original version of the identified physical block to be overwritten.

10. The storage controller of claim 9 wherein the storage controller is further configured to process the received write request by overwriting the identified physical block in response to determining that no other copies of the mapped storage system may access the identified physical block, and
wherein the storage controller is further configured to process the received write request by allocating a new physical block from the plurality of physical blocks and writing data of the received write request into the new physical block in response to determining that another copy of the mapped storage system may access the identified physical block.

11. The storage system of claim 8 wherein the ancestral meta-data associated with each copy of the mapped storage volume comprises:
an ordinal value associated with said each copy wherein the ordinal value associated with a new copy is incremented when each new copy is created by the storage controller; and
an ancestral volume bitmask field indicating ancestral relationships between the associated new copy of the mapped storage volume and other copies of the mapped storage volume, wherein said each copy of the mapped storage volume is associated with a corresponding unique bit in the ancestral volume bitmask field and wherein the corresponding unique bit is derived from the ordinal value associated with said each copy of the mapped storage volume,
wherein the storage controller is further configured to assign, as each new copy is created, the corresponding unique bit of a newly created copy into the ancestral bitmap field of each ancestor of the new copy.

12. The storage system of claim 11 wherein the reference meta-data associated with each physical block further comprises:
the possible reference and the explicit reference bitmask fields defining which of the multiple copies of the mapped storage volume may reference the corresponding physical block,
wherein the storage controller is configured to update the possible reference and the explicit reference bitmask fields of the reference meta-data associated with a physical block that is to be overwritten wherein the update includes setting and/or resetting unique bits in the possible reference and the explicit reference bitmask fields to indicate which of the one or more of copies may still access an original version of the physical block to be overwritten.

13. The storage system of claim 12 wherein the possible reference and the explicit reference bitmask fields further comprises:
a possible reference bitmask where each possible reference bit corresponds to a unique bit of a corresponding copy and wherein said each possible reference bit indicates whether the corresponding copy may possibly reference the associated physical block; and an explicit reference bitmask where each explicit reference bit corresponds to a unique bit of the corresponding copy and wherein said each explicit reference bit indicates whether the corresponding copy actually references the associated physical block.

14. The storage system of claim 13 wherein the storage controller is further configured to update the possible reference and the explicit reference bitmask fields in processing the write request as follows:
   resetting the unique bit corresponding to the identified copy in the possible reference bitmask corresponding to the identified physical block;
   if the identified copy is the ancestral parent of any later created ancestral child copies of the mapped storage volume, then resetting the unique bits corresponding to each ancestral child of the identified copy in the possible reference bitmask corresponding to the new physical block and setting the unique bits corresponding to each ancestral child of the identified copy in the explicit reference bitmask of the identified physical block.

15. The storage system of claim 14 wherein the storage controller is further configured to determine which copies of the mapped storage volume actually reference the identified physical block as follows:
   bitwise ANDing the possible reference bitmask of the identified physical block with the ancestral volume bitmask of the copy that created the identified physical block to generate a possible volume reference bitmask; and
   bitwise ANDing the possible volume reference bitmask with the bitwise inverse of the explicit reference bitmask of the identified physical block.

16. A method for managing copies of a mapped storage volume in a storage system, the storage system comprising a storage controller and a plurality of storage devices, each having a plurality of physical blocks, the method comprising:
   creating a copy of the mapped storage volume from a previous copy of the mapped storage volume;
   updating ancestral meta-data for the copy, the previous copy, and any parental ancestor copies of the previous copy to indicate the ancestral relationship among the copies;
   associating reference meta-data with each physical block, wherein the reference meta-data comprising a possible reference bitmask and an explicit reference bitmask; and
   processing a write request to an identified physical block in an identified copy wherein the step of processing further comprises:
   determining from the reference meta-data associated with the identified copy whether any other copies having an ancestral relationship with the identified copy may access the identified physical block; and
   responsive to a determination that another copy may access the identified physical block, performing the additional steps of:
   writing data supplied in the write request to a new physical block in the plurality of storage devices;
   updating the reference meta-data associated with the new physical block to indicate that the identified copy may access the new physical block; and
   updating the reference meta-data associated with the identified physical block to indicate that the identified copy no longer can no longer access the identified physical block.

17. The method of claim 16 wherein the step of updating reference meta-data associated with the identified physical block further comprises:
   resetting a unique bit associated with the identified copy in the possible reference bitmask to indicate that the identified copy no longer accesses the identified physical block; and
   setting zero or more unique bits in the explicit reference bitmask wherein each of the zero or more unique bits is associated with another copy of the mapped storage volume that has the identified copy as a parental ancestor to indicate that said another copy still references the identified physical block.

* * * * *